G. F. JAUBERT.
APPARATUS FOR REGENERATING VITIATED AIR.
APPLICATION FILED AUG. 22, 1907.
928,978.
Patented July 27, 1909.
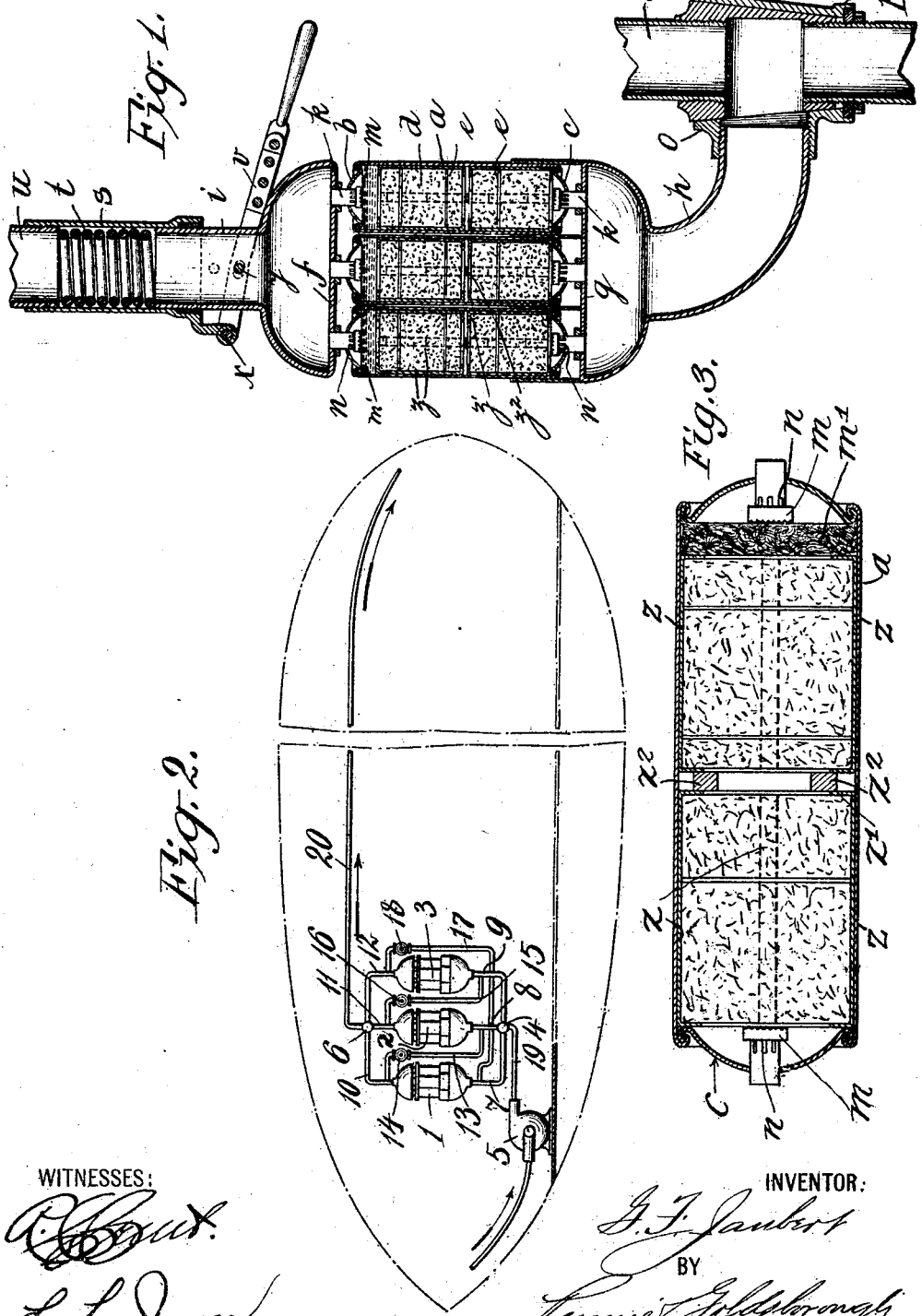
WITNESSES:
INVENTOR:

UNITED STATES PATENT OFFICE.

GEORGE FRANÇOIS JAUBERT, OF PARIS, FRANCE.

APPARATUS FOR REGENERATING VITIATED AIR.

No. 928,978.　　　Specification of Letters Patent.　　Patented July 27, 1909.

Application filed August 22, 1907. Serial No. 389,722.

*To all whom it may concern:*

Be it known that I, GEORGE FRANÇOIS JAUBERT, a citizen of the Swiss Republic, residing at 155 Boulevard Malesherbes, Paris, France, have invented certain new and useful Improvements in and Relating to Apparatus for Regenerating Vitiated Air, of which the following is a specification.

This invention has for its object means for regenerating air vitiated by respiration, particularly in submarine vessels, and this at any temperature, even below the normal temperature.

Suggestions have already been made for purifying air vitiated by respiration and also for regenerating it by employing certain alkaline peroxids, such as peroxid of sodium, $Na_2O_2$, or of sodium-potassium, $NaKO_2$, both of which under the influence of water vapor and of the carbonic acid contained in the vitiated air are decomposed, retaining these impurities and liberating gaseous oxygen. These peroxids with a sodium base present the great defect of absorbing a large quantity of water in a cold state without liberating oxygen. Moreover, the carbonic acid acting upon these hydrates with a peroxid of sodium base decomposes them on the surface only; each particle at once becomes surrounded by a layer of crystallized carbonate of sodium, and the reaction stops, the central part of each particle of peroxid remaining unattacked. The present invention obviates these defects.

In the accompanying drawing, which represents by way of example a constructional form of apparatus for carrying out the process applied to a submarine vessel:—Figure 1 is a vertical section through one element of the apparatus. Fig. 2 is a diagrammatic view of the apparatus as a whole mounted on a submarine vessel. Fig. 3 is a central section on a larger scale of one of the cartridges.

The inventor has recognized that peroxid of potassium obtained as pure as possible, for example by the process described in the applicant's co-pending application Ser. No. 373,995, filed 16th May, 1907, "Manufacture of peroxid of potassium or mixtures containing the same", decomposes under the influence of water vapor in a cold state (probably owing to the local heat liberated by the hydration) giving gaseous oxygen and hydrate of potassium, which under the influence of the carbonic acid gives deliquescent carbonate of potassium, which crystallizes without water of crystallization.

The process carried out by the apparatus of the present invention consists in causing the air vitiated by respiration and containing carbonic acid and water vapor to pass in the form of an appropriately directed current over peroxid of potassium at the surrounding temperature, so that, by decomposing in this manner, under the influence of the water vapor, the peroxid of potassium, there is produced gaseous oxygen enriching the air, and hydrate of potassium which absorbs the carbonic acid, the oxygen is restored to the air and the carbonic acid eliminated.

In the apparatus represented in the drawing, each element (Fig. 1) comprises a number (seven for example) of cartridges $a$, each composed of a cylindrical metal case closed by two weak ends $b$ and $c$ and containing peroxid of potassium. The peroxid of potassium is separated into two masses, each of which is inclosed within a frame-work made up of metal strips $z$ extending between annular baffle-plates $z'$, and inclosing the separating perforated metal washers $e$ coated with asbestos. The two frame-works are separated by interposed blocks $z^2$. These cartridges are arranged between two plates $f$ and $g$ which terminate two pipes, one of which $h$ supplies the vitiated air while the other $i$ serves for the discharge of this air after it has been regenerated. Each of the plates $f$ and $g$ is provided with a number of tubular sockets $k$ equal to the number of cartridges $a$, and terminating in the crowns $m$ having a serrated edge and resting upon layers of asbestos $m'$ for retaining any impurities contained in the air which passes through. The tubular sockets $k$ are also provided with openings $n$ and pass through the ends $b$ and $c$ of the cartridges $a$, thus placing the interior of these cartridges in communication with the pipes $h$ and $i$. To permit of arranging the cartridges in position, the pipe $h$ is fixed to the movable part $o$ of an elbow fixed by a socket $p$ to an air supply pipe. The upper pipe $i$ passes through a stuffing-box in a sleeve $s$ screwed to the pipe $u$ and is subjected to the action of a spring $t$ bearing upon the extremity of the pipe $u$. A hand lever $v$ pivoted at $x$ to the sleeve $s$ and engaging with trunnions $y$ fixed to the pipe $i$ enables this latter to be lifted.

In order to change the cartridges $a$, the plate $f$ is raised by means of the lever $v$, thereby releasing the sockets $k$ from the cartridges $a$. The apparatus is then caused to turn about the pipe $q$; the spent cartridges are removed, and replaced by fresh ones, whereupon the apparatus is again arranged in the position represented in the drawing.

The battery represented in Fig. 2 consists of three groups of cartridges 1, 2 and 3, each of their extremities communicating by the intermediary of a three-way cock 4 with the force pipe of a fan 5 supplying the vitiated air, and then by the intermediary of another similar cock 6 with a discharge pipe for the regenerated air. The cock 4 is arranged in such a manner that it is able to place the air admission pipe 19 in communication with one of the pipes 7, 8 and 9 respectively leading to the groups of cartridges 1, 2 and 3, and similarly the cock 6 is able to place the discharge pipe 20 in communication with each of the exhaust pipes 10, 11 and 12, of these groups. The pipe 13 provided with a cock 14 branches off the pipe 10 and terminates at the pipe 8. Similarly a pipe 15 provided with a cock 16 connects the pipe 11 with the pipe 9, and a pipe 17 with a cock 18 places the pipes 12 and 7 in communication.

The operation is as follows:—In order to regenerate the vitiated air drawn in by the fan 5 the three-way cock 4 is arranged in such a manner as to send this air through the pipe 7 into the group 1 for example. The cock 14 is opened, the cocks 16 and 18 being closed, and the three-way cock 6 is arranged in such a manner as to place the pipes 11 and 20 in communication. The air coming from the pipe 19 passes through the pipe 7, becomes freed from its carbonic acid and its water vapor in the group 1 in producing a liberation of oxygen, then passes through the pipe 13 into the group 2 where its purification is completed and it becomes charged with a fresh quantity of oxygen. The completely regenerated air issues through the pipe 11 and returns into the atmosphere of the ship through the pipe 20. When the group 1 of cartridges is exhausted, the cock 14 is closed, the cock 4 is arranged in such a manner as to place the pipe 19 in communication with the pipe 8, the cock 16 is opened and the pipes 12 and 20 are placed in communication. The vitiated air then follows the pipe 19, the group 2, the pipe 15, the group 3, and then passes into the atmosphere through the pipes 12 and 20. Finally, when the group 2 is exhausted, the cock 16 is closed, the cock 18 is opened, placing the pipes 19 and 9 and the pipes 10 and 20 in communication, and the purification of the air takes place in the same manner in the pipe 9, the group 3, the pipe 17 and the group 1 which has been provided with fresh cartridges.

The advantages are as follows:—The small quantity of water vapor existing in the air to be regenerated is effectively employed for decomposing the peroxid of potassium instead of being lost for the greater part (9/10ths) in becoming bound in the form of water of crystallization as is the case with products having a soda base. Carbonate of potassium being deliquescent dissolves gradually, and never forms a hard crust inclosing the grains of peroxid to withdraw them from the action of the water vapor and of the carbonic acid. The peroxid of potassium thus permits of regenerating in a cold state large volumes of air at the ordinary temperature, and even at a lower temperature, while heretofore it has been necessary to assist the decomposition of peroxid of sodium or of sodium-potassium by heat (contained in the latent state in the water vapor issuing from the lungs at 37°). The regeneration of the air issuing from the apparatus is as complete as possible, as this air has traversed two appliances containing peroxid of potassium at different degrees of activity.

This process is advantageously applicable to the regeneration of air in large spaces, particularly in the submarine vessels where the air is greatly cooled by the walls and where the greater part of the water vapor is condensed by the cold surface of the hull.

Having now particularly described and ascertained the nature of my said invention and in what manner the same is to be performed, I declare that what I claim is:—

1. An apparatus for the chemical purification of air, comprising a system of conduits through which the air is passed, and a cartridge receptacle interposed in said system, said receptacle carrying projecting tubular sockets terminating in crowns having a serrated edge, and cartridges having weak ends adapted to be pierced by the serrated crowns and containing a purifying chemical.

2. An apparatus for the chemical purification of air, comprising a conduit for leading the air to the purifying apparatus, a perforated plate closing the end of said conduit, a second conduit for leading off the purified air, a perforated plate closing the end of said conduit, and means for separating and bringing together again said plates, whereby cartridges containing purifying chemicals may be clamped between the perforations in the plates, and the air passed through said cartridges.

3. An apparatus for the chemical purification of air, comprising a conduit for leading the air to the purifying apparatus, and a second conduit for leading the air from said purifying apparatus, a perforated plate closing the end of each conduit, tubular sockets terminating in serrated crowns projecting from said plates, means for separating said plates and bringing them together again, and cartridges having weak ends adapted to be clamped between the plates and perforated by the serrated crowns.

4. An apparatus for the chemical purification of air, comprising a conduit for leading the air to the purifying apparatus, and a second conduit for leading the air from the purifying apparatus, perforated plates arranged one above the other and closing the ends of the respective conduits, the lower plate being supported for movement from beneath the upper plate, and means for raising and lowering the upper plate, whereby cartridges containing purifying chemicals may be placed above the perforations on the lower plate and clamped in position between said plates.

5. An apparatus for the chemical purification of air comprising a conduit for leading the air to the purifying apparatus, and a second conduit for leading the air from the purifying apparatus, the ends of said conduits being arranged one above the other, and the end of the under conduit being supported for movement from beneath the upper conduit, a perforated plate closing the end of said under conduit, tubular sockets projecting from said plate and communicating with the perforations, and crowns at the upper ends of said sockets, a telescoping tube fitting within the end of the upper conduit, means for raising and lowering said tube, and a perforated plate closing the end of said tube and carrying projecting tubular sockets terminating in serrated crowns, whereby cartridges having weak ends may be clamped between said plates and perforated by the serrated crowns.

In testimony whereof I have hereunto placed my hand at Paris this tenth day of August 1907.

GEORGE FRANÇOIS JAUBERT

In the presence of two witnesses:
HANSON C. COXE,
ALBERT NUNÈS.